United States Patent [19]

Glaser et al.

[11] 4,222,757

[45] Sep. 16, 1980

[54] METHOD FOR MANUFACTURING GLASS FIBERS

[75] Inventors: H. I. Glaser, Granville; F. D. Meyers, Sylvania; Elmer P. Rieser, Pickerington; Thomas K. Thompson, Granville, all of Ohio

[73] Assignee: Owens-Corning Fiberglas Corporation, Toledo, Ohio

[21] Appl. No.: 952,039

[22] Filed: Oct. 16, 1978

[51] Int. Cl.² .............................................. C03B 37/02
[52] U.S. Cl. .............................................. 65/2; 65/1; 65/12
[58] Field of Search ...................... 65/1, 2, 5, 11 N, 12

[56] References Cited

U.S. PATENT DOCUMENTS

| | | | |
|---|---|---|---|
| 2,291,289 | 7/1942 | Slayter et al. | 65/12 |
| 2,335,135 | 11/1943 | Staelin | 65/2 |
| 3,150,946 | 9/1964 | Russell | 65/2 |
| 3,232,730 | 2/1966 | Drummond | 65/2 |
| 3,248,192 | 4/1966 | Millet | 65/5 |
| 3,256,078 | 6/1966 | Drummond | 65/2 |
| 3,257,181 | 9/1966 | Stalego | 65/12 |
| 3,275,720 | 9/1966 | Ohsol | 264/48 |
| 3,288,581 | 11/1966 | Schweppe | 65/2 |
| 3,625,025 | 12/1971 | Jensen | 65/12 X |
| 3,905,790 | 9/1975 | Strickland et al. | 65/2 |
| 3,969,099 | 7/1976 | Reese | 65/12 X |
| 4,118,210 | 10/1978 | Watanabe et al. | 65/12 X |

FOREIGN PATENT DOCUMENTS 533552 10/1976 U.S.S.R. ...................................... 65/12

OTHER PUBLICATIONS

Loewenstein, Manufacturing Tech. of Continuous Glass Fibres, Elsevier Sci. Pub. Co., Amsterdam, N.Y., 1973, pp. 93–95.

*Primary Examiner*—Robert L. Lindsay, Jr.
*Attorney, Agent, or Firm*—Ronald C. Hudgens; Philip R. Cloutier; Kenneth H. Wetmore

[57] ABSTRACT

This invention relates to a method and apparatus for forming glass fibers. The invention comprises flowing streams of molten glass from a stream feeder through orificed projections depending from the feeder floor, directing gas upwardly into contact with the streams of molten glass at a velocity and in an amount effective to convey away from the streams sufficient heat to render the glass of the streams attenuable to fibers without appreciably disturbing the ambient gas above the streams in the region between the orificed projections and attenuating fibers from the streams of molten glass.

19 Claims, 3 Drawing Figures

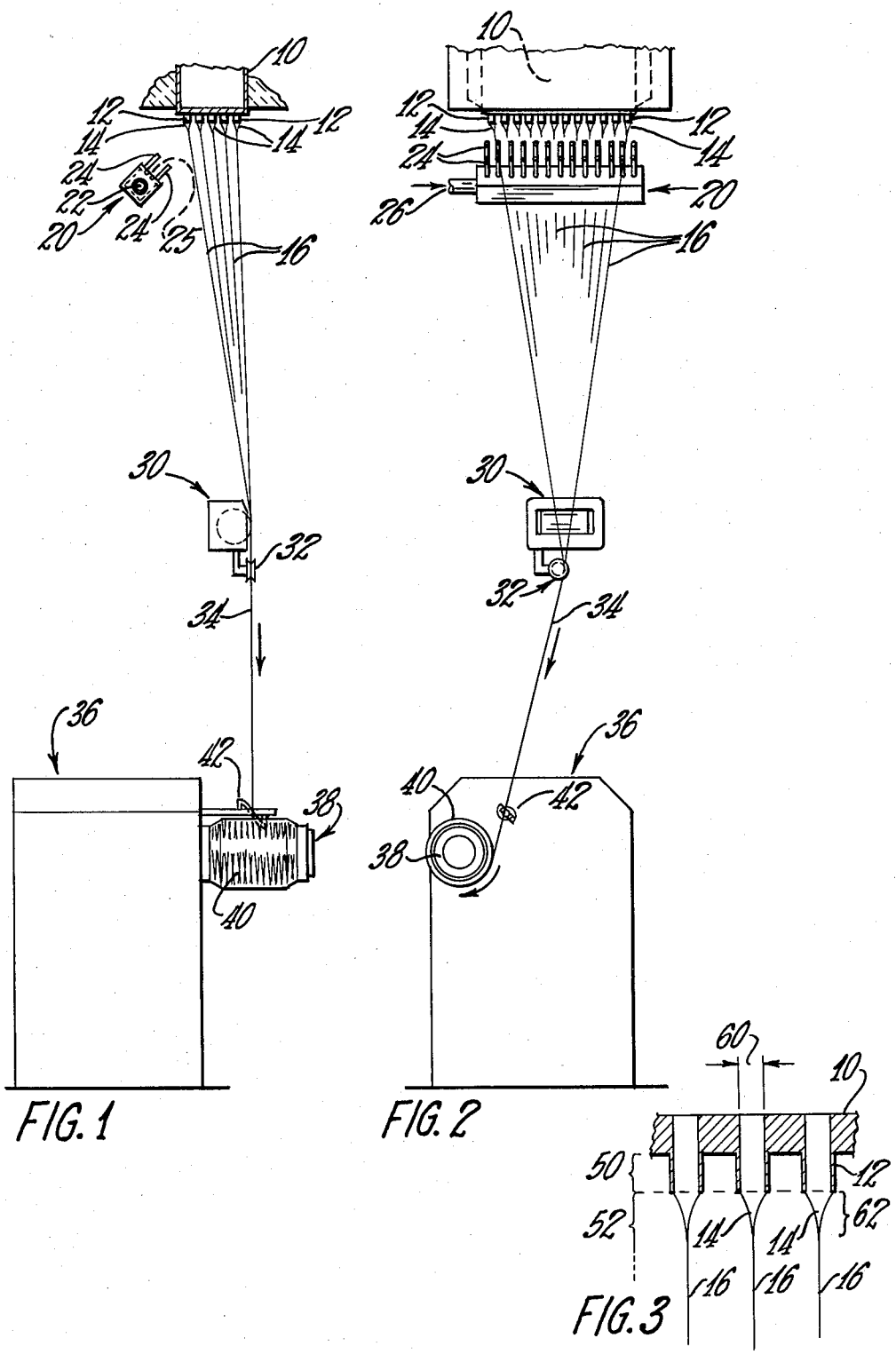

METHOD FOR MANUFACTURING GLASS FIBERS

BACKGROUND OF THE INVENTION

In recent years, there has been considerable interest in the production of glass fibers. Due to the tremendous usages of glass fibers, this interest has been particularly focused on increasing the production of individual fiber forming stations.

In the production of fibers, molten glass is typically passed through tips or orifices in a bushing to create individual fibers. As the molten streams of glass flow through the tips or orifices for attenuation into fibers, the fiber forming environment below the bushing must be carefully controlled for a stable fiber forming operation.

Glass fiber forming bushings today conventionally have a plurality of tips projecting below the bushing floor through which streams of molten glass flow. Cones of glass form at the exit area of each tip and fibers are attenuated therefrom. The fiber forming environment in the cone region must be carefully controlled. Conventionally, this is done by placing solid metallic heat exchanging units or finshields beneath the bushing and between rows of tips. Such finshield units have been used for many years to control the fiber forming region beneath a bushing. Such a heat exchanging device is described in U.S. Pat. No. 2,908,036.

Over the years, the number of fibers produced by a single bushing has increased greatly. In the past it was common for a bushing to produce about 200 fibers. Today bushings can produce 2000, or more, fibers. As the number of fibers per bushing continues to increase, problems with conventional fiber forming processes and apparatus have arisen. When using conventional finshield units to control the fiber forming environment, one is limited in the tip density that can be employed in the fiber forming bushing as there must be sufficient space for the fin members to project between rows of tips. Thus, to increase the number of fibers being formed by a single bushing, the physical size of the bushing must be increased. With bushings of increased size and increased glass throughput per tip, solid finshield members as described in U.S. Pat. No. 2,908,036 are operated at the very upper limit of their physical heat transfer capability.

As bushings are produced to create even larger numbers of fibers per bushing and as the throughput per bushing tip or orifice is increased, environmental control by conventional finshield units can be inadequate. There has been considerable activity in the glass fiber forming field to develop a process and apparatus for controlling the fiber forming environment in such bushings.

One such glass fiber forming process is described in U.S. Pat. No. 3,905,790. In this patent, the need for conventional finshields is eliminated. This patent utilizes a bushing having a flat orifice plate with closely packed non-tipped orifices and a lower air nozzle from which an upwardly directed flow of air issues to impinge directly on the orifice plate. The patent teaches that the orifice density of such a bushing can be greatly increased over that of a conventional bushing using conventional finshields. The impingement of the cooling air directly upon the orifice plate to flow outwardly along the plate cools the molten glass cones to maintain fiber separation and to eliminate any stagnant air at the under surface of the plate. Problems can arise in maintaining a stable glass fiber forming operation with this process. Problems can also arise in restarting this process after there is an interruption in the formation of fibers. After a fiber forming interruption a tipless bushing does not form beads of glass at each orifice as does a tipped bushing. Restarting such an orificed bushing requires a very skilled operator and the restarting operation is quite time-consuming.

Improvements in the glass fiber forming process and apparatus are desired.

DESCRIPTION OF THE INVENTION

It is one object of this invention to provide an improved method and apparatus for producing fibers from a high temperature molten material.

It is another object of this invention to provide an improved method and apparatus for the production of glass fibers.

It is still another object of this invention to provide an improved method and apparatus for increasing the production of glass fibers from a single bushing.

It is a further object of this invention to provide an apparatus for the production of glass fibers which incorporates a bushing having a high density of tips.

Other objects will become apparent as the invention is described hereinafter in detail with reference being made to accompanying drawings.

In accordance with one aspect of this invention, there is provided a method of forming glass fibers which comprises flowing streams of molten glass from a stream feeder through orificed projections depending from the feeder floor, directing gas upwardly into contact with the streams of molten glass at a velocity and in an amount effective to convey from the streams sufficient heat to render the glass of the streams of a viscosity attenuable to fibers without appreciably disturbing the ambient gas above the streams in the region between the orificied projections, and attenuating fibers from the streams of molten glass.

Also, according to this invention there is provided a method of forming glass fibers which comprises flowing streams of molten glass from a stream feeder through orificed projections depending from the feeder floor, directing gas upwardly into contact with the streams of molten glass at a velocity and in an amount effective to convey away from the streams sufficient heat to render the glass of the streams attenuable to fibers without impinging on the feeder floor to essentially eliminate stagnant gas adjacent the feeder floor, and attenuating fibers from the streams of molten glass.

Also, according to this invention there is provided apparatus for forming glass fibers which comprises means for flowing streams of glass from a stream feeder through orificed projections depending from the feeder floor, the streams of glass forming cones of glass at the discharge end of the orificed projections during attenuation of fibers from the streams of glass and the orificed projections being in close compacted relation to retain a layer of gas adjacent the feeder floor, means for directing gas upwardly into contact with the cones of glass at a velocity and in an amount to convey from the cones of glass sufficient heat to render the glass of the cones attenuable to fibers without appreciably disturbing the layer of gas in the region of the orificed projections, and means for attenuating fibers from the streams of molten glass.

In addition, according to this invention there is provided apparatus for forming glass fibers which comprises means comprising a stream feeder for flowing streams of glass from the stream feeder through orificed projections depending from the feeder floor, the streams of glass forming cones of glass at the discharge end of the orificed projections during attenuation of fibers from the streams of glass and the orificed projections being in close compacted relation to retain a layer of gas adjacent the feeder floor, means for directing gas upwardly into contact with the cones of glass at a velocity and in an amount to convey from the cones of glass sufficient heat to render the glass of the cones attenuable to fibers without impinging on the feeder floor to essentially eliminate stagnant gas adjacent the feeder floor, and means for attenuating fibers from the streams of molten glass.

DESCRIPTION OF THE DRAWINGS

FIG. 1 is a front elevational view of a glass fiber forming operation in accordance with the present invention.

FIG. 2 is a side elevational view of the glass fiber forming operation shown in FIG. 1.

FIG. 3 is a partial cross-sectional view of a bushing in accordance with the present invention.

These drawings are generally illustrative of the method and apparatus for carrying out the invention but are not to be considered as limiting the invention to the specifics thereof.

DESCRIPTION OF THE PREFERRED EMBODIMENTS

Referring now more particularly to the drawings, FIGS. 1 and 2 illustrate a fiber forming operation. Mineral material, such as glass, is maintained in a molten condition in the bushing or stream feeder assembly 10 from which a plurality of streams of material is emitted from orificed tips or projections depending from the bushing or feeder floor. The streams of glass form cones of glass 14 at the discharge end of the orificed projections. Glass fibers 16 are attenuated from the cones of molten glass formed at each orifice. The fibers are coated by size applicator 30 and gathered into strand 34 by gathering shoe 32. The strand is collected into package 40 on rotatably driven collet 38 on winder assembly 36. As the strand is being collected on the winder collet, it is reciprocated by traverse 42 for uniform collection of the strand on the collet.

The orifice projections depending from the feeder floor are in closely compacted relation to retain or maintain a layer of gas between the tips, adjacent the feeder floor. Since conventional finshield units are not needed, the tips can be placed more closely together than in a conventional glass fiber forming bushing. The stream feeder tip density can be expressed in terms of the number of tips per square inch of feeder floor. One way of calculating this density is to divide the number of tips projecting from the feeder floor by the area of the feeder floor within the center line of the orifice pattern of the outside tips. In order to retain or maintain a quiescent layer of gas adjacent the tips, the bushing tip density should be within the range of from about 25 tips per square inch to about 150 tips per square inch. The tip density range which is preferred is from about 60 tips per square inch to about 80 tips per square inch.

The depending projections or tips are in close compacted relation to promote the retention of a layer of gas adjacent the feeder floor. This layer of gas generally extends from the feeder floor to the exit end of the orificed projections. This layer of gas is heated by the bushing and serves to insulate the bushing and its tips from the ambient environment in the forming room. This reduces the heat loss from the bushing and tends to make the glass fiber forming operation more stable. As will be discussed in more detail below, this layer of gas is generally a quiescent layer of gas which is not substantially disturbed during the fiber forming operation.

To control the glass fiber forming environment, gas blower means 20 is provided. As shown, the gas blower 20 comprises gas inlet 26, chamber 22 and a plurality of gas exit tubes or nozzles 24 arranged in two parallel rows and a row of exit orifices 25 therebetween. The gas blower is positioned below the bushing and can be located a distance of from about three inches to about twelve inches below the bushing with a distance of from about eight inches to about ten inches being preferred. The gas can be directed upwardly at an angle of from about 80° to about 45° from the horizontal with a range of about 55° to about 50° being preferred. Gases such as, for example, air, carbon dioxide, nitrogen or mixtures thereof can be employed.

As shown, air is directed transversely from one side of the cones of glass and the bushing. However, any mechanical arrangement that directs cooling air or other gas upwardly into contact with the cones of glass at a velocity and in an amount to convey from the cones of glass sufficient heat to render the glass of the cones attenuable to fibers without appreciably disturbing the layer of gas at the region of the depending projections is satisfactory for use in this invention. A single nozzle, other multiple nozzle arrangements or a nozzle with a slit can be used. Deflector plates which deflect air to an upward path can also be employed. While introduction of the upwardly moving air from one side of the tipped bushing is entirely satisfactory and is preferred, the air can, if desired, be introduced from two or more sides of the bushing.

The air volumes and rates to be employed may readily be determined by the routineer and will depend on such factors as bushing size, number of tips, tip density, glass throughput per tip, nozzle type and size, nozzle location and the like. Air can be supplied to the blower at a rate of about 1000 standard cubic feet per hour to about 15,000, or more, standard cubic feet per hour to be directed upwardly into contact with the cones of glass to render the glass of the cones attenuable to fibers without substantially disturbing the relatively stagnant layer of air adjacent the bushing floor. The gas does not impinge on the feeder floor to essentially eliminate gas adjacent the feeder floor. Also, the layer of gas is not completely removed from the feeder floor by the gas directed upwardly.

FIG. 3 shows a portion of the bushing floor in more detail. Bushing 10 is provided with a plurality of tips 12 projecting from the feeder floor. The tips have an inside diameter 60 in the range about 0.04 inch to about 0.09 inch. In a preferred embodiment the inside diameter of the orificed projections is in the range of about 0.045 inch to about 0.055 inch. The depending projections can vary in length in the range of about 0.04 inch to about 0.15 inch. In a preferred embodiment, the tip length is in the range of about 0.06 inch to about 0.07 inch. The layer of gas 50 is shown extending from the feeder floor to the end of the orificed projections. It is within the scope of the invention that the thickness of this layer of gas can be somewhat larger or smaller than the length of the downwardly depending tip. This layer of gas is relatively stagnant as compared to the gas in the glass cone and fiber region of the glass fiber forming operation.

The gas from a nozzle 20 is projected up into the bushing area and is illustrated by zone 52. The gas directed upwardly into contact with cones 14 does not substantially disturb the layer of gas adjacent the feeder floor. As compared to the amount of air movement and the velocity of the air in zone 52, the air in layer 50 is relatively stagnant or quiescent. Any movement in this quiescent layer is substantially less than that of the active layer of air (having a similar thickness) below the ends of the tips (in the cone region).

The viscosity and temperature of the glass in cone 14 is controlled by the cooling air in zone 52. If the cone becomes too small, the stress in the glass in the cone becomes so large that fiber forming will be interrupted. If the cone becomes too large, glass will begin pumping through the tip in an uncontrolled manner and fiber forming will be interrupted. Thus, it is critical that the cone projecting from the orificed projection be controlled for a stable fiber forming operation. With a bushing having tips with inside hole diameters in the range of from about 0.04 inch to about 0.09 inch, cone lengths, that is, the cones which are visible to the naked eye as being red-hot and projecting down from the exit ends of the orificed projections, are controlled to be in the range of from about 0.015 inch to about 0.7 inch. For bushings having tips with inside diameters in the range of about 0.045 inch to about 0.055 inch, the visible, red-hot, portion of each glass cone is controlled by the cooling air in zone 52 to have a length in the range of about 0.03 inch to about 0.09 inch. The cooling air in zone 52 controls the glass cones projecting from the orifice projections and the control can be defined in terms of the draw-down ratio which is equal to the inside hole diameter of the orificed projection divided by the length of the visible red-hot portion of the glass cone projecting from the orifice projection. The cooling air in zone 52 should be controlled to provide a draw-down ratio in the range of about 3 to about 0.13. In a preferred embodiment, the draw-down ratio is maintained within the range of about 1.5 to 0.5.

The following examples are included for illustrative purposes only and are not intended to limit the scope of the invention.

EXAMPLE 1

In this example, a bushing having 275 tips was used. Each tip had an inside hole diameter of 0.046 inch and a tip length of 0.05 inch. The bushing had a tip density of 63 tips per square inch. Fibers were successfully drawn in stable operation and filament separation was maintained when air was directed upwardly from a blower to the cone region without disturbing the relatively quiescent zone of air adjacent the bushing floor. The air was directed upwardly into contact with the cones of glass by a blower having a row of six discharge tubes (each tube being about two inches in length and about one half inch in diameter) connected to a common discharge plenum. Air was supplied to the plenum in an amount within the range of from about 1200 standard cubic feet per hour to about 2200 standard cubic feet per hour, with a rate of about 1800 standard cubic feet per hour being preferred. The upwardly directed air controlled the visible glass cones projecting from the tips to a length within the range of from about 0.03 inch to about 0.09 inch.

EXAMPLE 2

In this example, a bushing having 482 tips was used. Each tip had an inside hole diameter of 0.058 inch and a length of 0.120 inch. The bushing had a tip density of 110 tips per square inch. Fibers were successfully drawn in stable operation and filament separation was maintained when air was directed upwardly from a blower to the cone region without disturbing the relatively quiescent zone of air adjacent the bushing floor. The air was discharged upwardly into contact with the cones of glass by a blower having a row of six discharge tubes (each tube being about two inches in length and about one half inch in diameter) connected to a common discharge plenum. Air was supplied to the plenum in an amount within the range of from about 1200 standard cubic feet per hour to about 2000 standard cubic feet per hour, with a rate of about 1600–1700 standard cubic feet per hour being preferred. The upwardly directed air controlled the visible glass cones projecting from the tips to a length within the range of from about 0.03 inch to about 0.12 inch.

EXAMPLE 3

In this example, a bushing having 483 tips was used. Each tip had an inside hole diameter of 0.043 inch and a length of 0.055 inch. The bushing had a tip density of 110 tips per square inch. Fibers were successfully drawn in stable operation and filament separation was maintained when air was directed upwardly from a blower to the cone region without disturbing the relatively quiescent zone of air adjacent the bushing floor. The air was discharged upwardly into contact with the cones of glass by a blower having a row of six discharge tubes (each tube being about two inches in length and about one half inch in diameter) connected to a common discharge plenum. Air was supplied to the plenum in an amount within the range of from about 1200 standard cubic feet per hour to about 2500 standard cubic feet per hour with a rate of about 1700–1900 standard cubic feet per hour being preferred. The upwardly directed air controlled the visible glass cones projecting from the tips to a length within the range of from about 0.03 inch to about 0.09 inch.

EXAMPLE 4

In this example, a bushing having 4,024 tips was used. Each tip had an inside hole diameter of 0.049 inch and a length of 0.065 inch. The bushing had a tip density of 74 tips per square inch. Fibers were successfully drawn in stable operation and filament separation was maintained when air was directed upwardly from a blower to the cone region without disturbing the relatively quiescent zone of air adjacent the bushing floor. The air was discharged upwardly into contact with the cones of glass by a blower having two rows of tubes (each tube being about four inches in length and about three eighths of an inch in diameter) and a row of orifices between the two rows of tubes connected to a common discharge plenum. Air was supplied to the plenum in an amount within the range of from about 4000 standard cubic feet per hour to about 15,000 standard cubic feet per hour with a rate of about 9000 standard cubic feet per hour being preferred. The upwardly directed air controlled the visible glass cones projecting from the tips to a length within the range of from about 0.03 inch to about 0.09 inch. The upwardly directed air did not impinge on the feeder floor to essentially eliminate stagnant gas adjacent the feeder floor. Also, the upwardly directed air did not completely remove the relatively quiescent zone of air adjacent the bushing floor.

Having described the invention in detail, it will be understood that such specifications are given for the sake of explanation. Various modifications and substitutions other than those cited may be made without departing from the scope of the invention as defined in the following claims.

We claim:

1. Method of forming glass fibers comprising:
   (a) flowing streams of glass from a stream feeder through orificed projections depending from the feeder floor, the streams of glass forming cones of glass at the discharge end of the orificed projections during attenuation of fibers from the streams of glass and the orificed projections being in close compacted relation to retain a layer of gas adjacent the feeder floor;
   (b) directing gas upwardly into contact with the cones of glass at a velocity and in an amount to convey away from the cones of glass sufficient heat to render the glass of the cones attenuable to fibers without appreciably disturbing the layer of gas in the region of the orificed projections; and
   (c) attenuating fibers from the streams of molten glass.

2. The method of claim 1 wherein the directed gas controls a visible, red-hot, portion of each glass cone such that the visible, red-hot portion of each glass cone projects from its orificed projection an amount within the range of from about 0.015 inch to about 0.7 inch.

3. The method of claim 2 wherein the range is from about 0.03 inch to about 0.09 inch.

4. The method of claim 1 wherein the directed gas controls the cones of glass such that the cones of glass have a draw-down ratio in the range of from about 3 to about 0.13.

5. The method of claim 4 wherein the range is from about 1.5 to about 0.5.

6. The method of claim 1 wherein the gas is directed transversely from one side of the cones of glass.

7. The method of claim 1 wherein the gas is directed in a plurality of streams.

8. The method of claim 1 wherein the directed gas is selected from a group comprising air, carbon dioxide and nitrogen.

9. Method of forming glass fibers from orificed projections of a stream feeder comprising:
   (a) drawing streams of glass from the orificed projections while maintaining a quiescent layer of gas in contact with the orificed projections, the streams of glass forming cones of glass at the discharge end of the orificed projections; and
   (b) directing a gas upwardly into contact with the cones of glass proximate the orificed projections to cool said glass in the absence of any substantial disturbance of said layer of gas.

10. The method of claim 9 wherein the directed gas controls the cones of glass such that the cones of glass have a draw-down ratio within the range of from about 3 to about 0.13.

11. The method of claim 10 wherein the range is from about 1.5 to about 0.5.

12. The method of claim 9 wherein the directed gas maintains a visible, red-hot, portion of each glass cone such that the visible, red-hot, portion of each glass cone projects from its orificed projection an amount within the range of from about 0.015 inch to about 0.7 inch.

13. The method of claim 12 wherein the range is from about 0.03 inch to about 0.09 inch.

14. Method of forming glass fibers comprising:
    (a) flowing streams of glass from a stream feeder through orificed projections depending from the feeder floor;
    (b) attenuating fibers from cones of molten glass formed at each orifice, the orificed projections being in close compacted relation to promote the retention of a layer of heated air adjacent the feeder floor; and
    (c) directing gas upwardly into contact with the cones of glass at a velocity and in an amount to convey from the cones of glass sufficient heat to control the temperature of the glass of the cones to render the glass attenuable to fibers without appreciably affecting the layer of heated air at the region of the orificed projections.

15. The method of claim 14 wherein the gas is directed transversely from one side of the cones of glass.

16. Method of making glass fibers comprising:
    (a) flowing streams of glass from an overhead feeder through closely compacted orifice tips depending from the feeder floor, the glass flow through said tips forming cones from which glass fibers can be attenuated;
    (b) enveloping the tips in a thermal insulating layer of gas directly beneath said plate, said layer being of a depth substantially equal to the vertical extension of the tips, said cones being exposed to the ambient atmosphere beneath the layer;
    (c) directing an upward flow of gas at said feeder floor in an amount and at a velocity:
       (i) sufficient to cool the glass of the cones to render the glass of the cones attenuable to fibers; yet
       (ii) insufficient to remove the layer of gas enveloping the tips; and
    (d) attenuating fibers from said cones.

17. Method of forming glass fibers comprising:
    (a) flowing streams of molten glass from a stream feeder through orificed projections depending from the feeder floor, a layer of gas being formed adjacent the feeder floor between the projections;
    (b) directing gas upwardly into contact with the streams of molten glass at a velocity and in an amount effective to convey away from the streams sufficient heat to render the glass of the streams attenuable to fibers without completely removing the layer of gas from the feeder floor; and
    (c) attenuating fibers from the streams of molten glass.

18. The method of claim 1 wherein the gas is not directed upwardly to impinge on the feeder floor to essentially eliminate stagnant gas adjacent the feeder floor.

19. Method of forming glass fibers comprising:
    (a) flowing streams of molten glass from a stream feeder through orificed projections depending from the feeder floor;
    (b) directing gas upwardly into contact with the streams of molten glass at a velocity and in an amount effective to convey away from the streams sufficient heat to render the glass of the streams attenuable to fibers without impinging on the feeder floor to essentially eliminate stagnant gas adjacent the feeder floor; and
    (c) attenuating fibers from the streams of molten glass.

* * * * *